United States Patent [19]

Kuriyama et al.

[11] 4,165,281

[45] Aug. 21, 1979

[54] METHOD AND UNIT FOR WASTEWATER TREATMENT BY MICROORGANISMS

[75] Inventors: Kiyoshi Kuriyama, Kyoto; Munetaka Sato; Tsuneo Matsuzaki, both of Yokohama; Masanori Honma, Yamato; Seiji Shida, Chigasaki, all of Japan

[73] Assignee: Niigata Engineering Co., Ltd., Tokyo, Japan

[21] Appl. No.: 836,921

[22] Filed: Sep. 26, 1977

[30] Foreign Application Priority Data

Sep. 24, 1976 [JP] Japan .............................. 51-114457

[51] Int. Cl.² .............................................. C02C 1/04
[52] U.S. Cl. ...................................... 210/17; 210/150
[58] Field of Search ............... 210/17, 150, 151, 505, 210/198 R, 508, 15, 496

[56] References Cited

U.S. PATENT DOCUMENTS 3,779,906 12/1973 Levin ..................................... 210/17
4,055,490 10/1977 Hasegawa et al. ..................... 210/17

FOREIGN PATENT DOCUMENTS

| 1486799 | 7/1969 | Fed. Rep. of Germany | 210/496 |
| 2702043 | 7/1977 | Fed. Rep. of Germany | 210/150 |
| 2726167 | 12/1977 | Fed. Rep. of Germany | 210/150 |
| 2742894 | 3/1978 | Fed. Rep. of Germany | 210/150 |
| 1315129 | 4/1973 | United Kingdom | 210/17 |
| 1419438 | 12/1975 | United Kingdom | 210/150 |

*Primary Examiner*—Benoit Castel
*Attorney, Agent, or Firm*—Sughrue, Rothwell, Mion, Zinn and Macpeak

[57] ABSTRACT

A method and a unit for wastewater treatment with microorganisms, in which at least one non-woven fibrous mat having a three-dimensional network structure is disposed as a supporting media in an aeration tank, microorganisms are retained on the surface of and in the interstices of the non-woven fibrous mat, and organic polluting matter in the wastewater is oxidatively decomposed by the microorganisms in the presence of oxygen.

12 Claims, 12 Drawing Figures

FIG. 1A
FIG. 1B
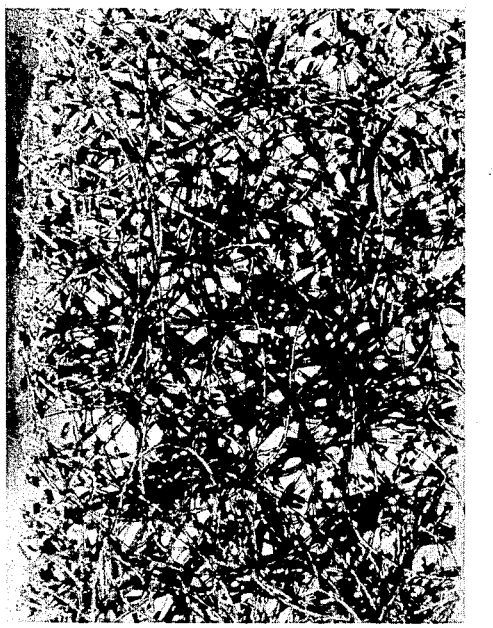
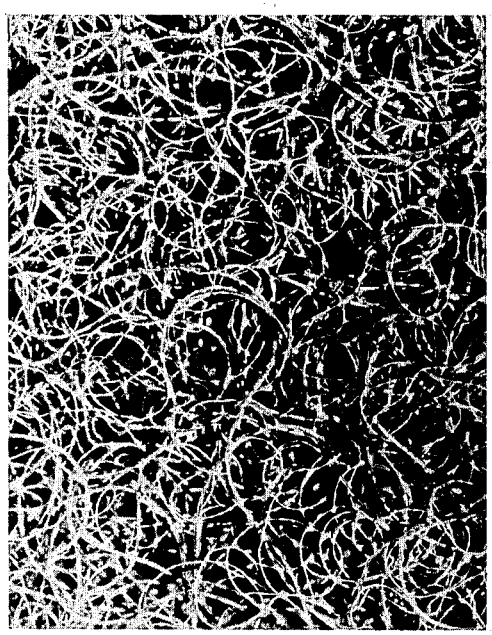

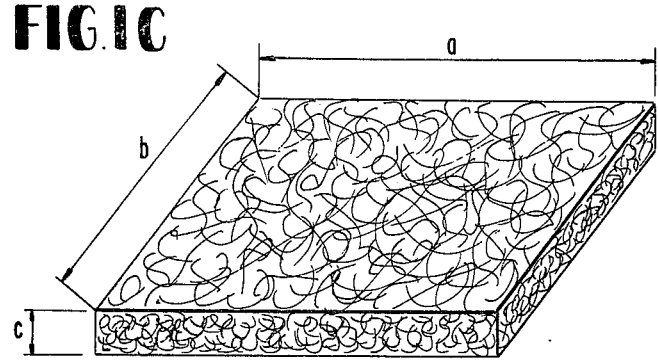
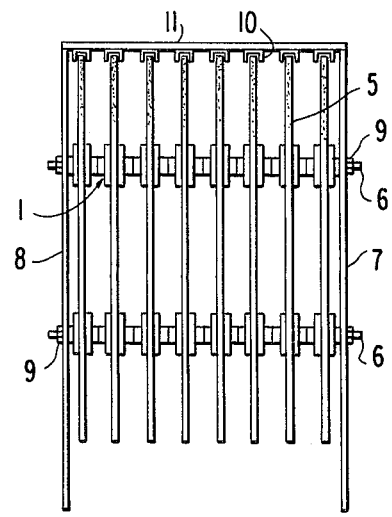
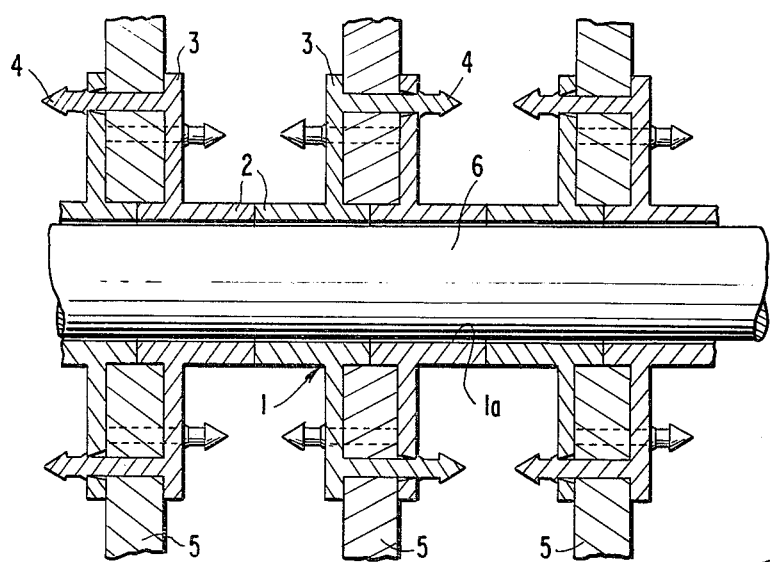
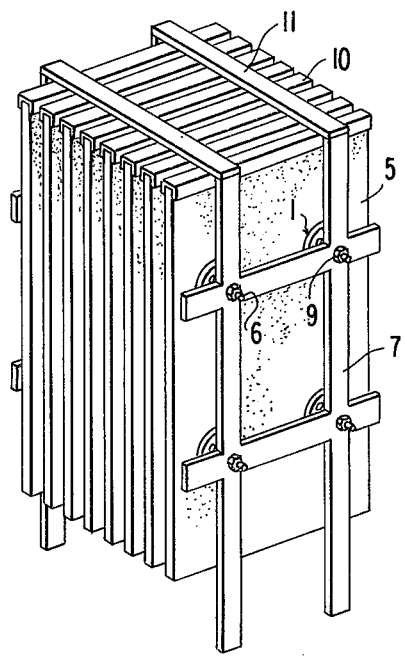
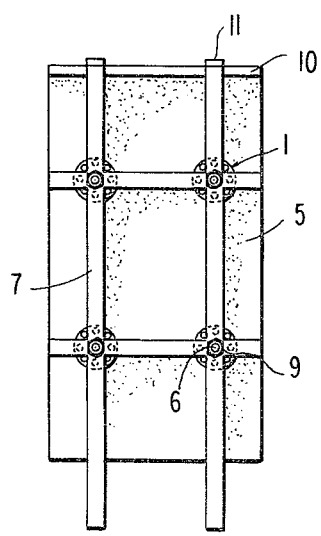

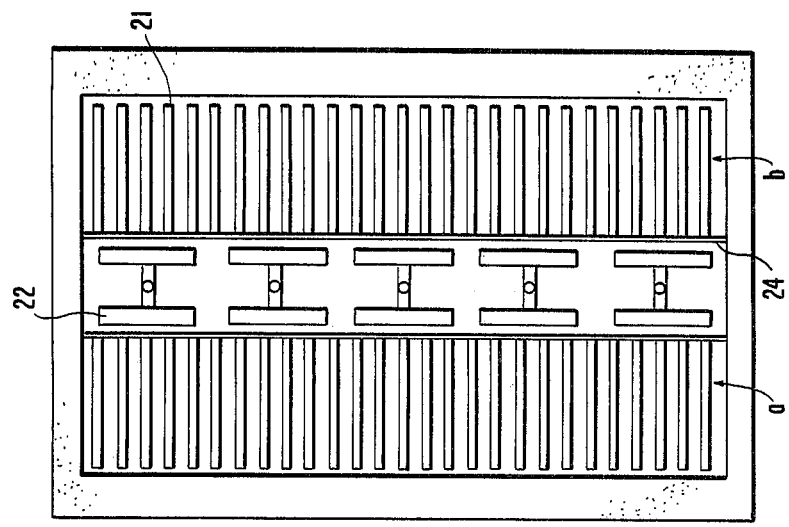
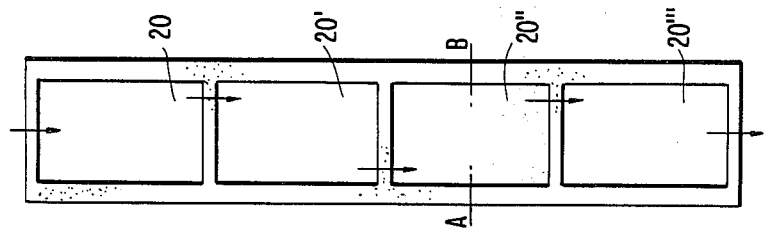
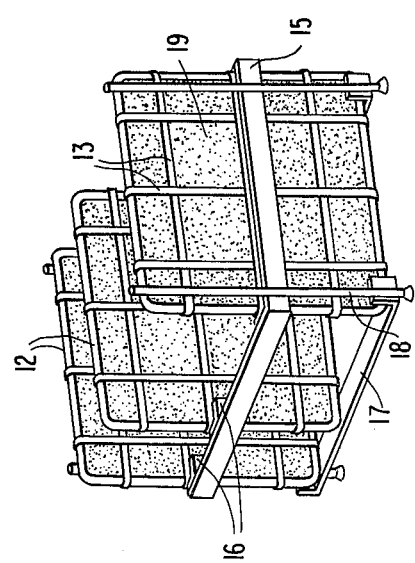
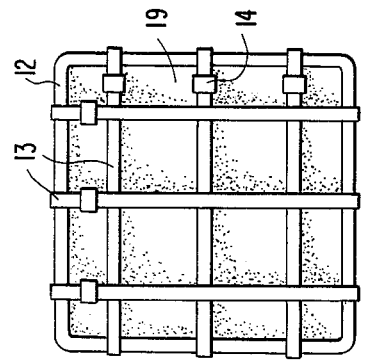
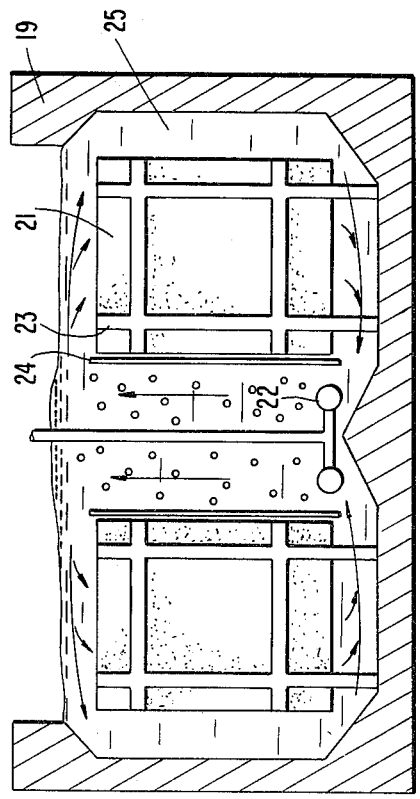

METHOD AND UNIT FOR WASTEWATER TREATMENT BY MICROORGANISMS

BACKGROUND OF THE INVENTION

1. Field of the Invention

This invention relates to a method and a unit for treating wastewater with microorganisms, and specifically to a method and a unit for wastewater treatment using a contact oxidation process.

2. Description of the Prior Art

Known techniques for wastewater treatment by the action of microorganisms include, for example, a conventional activated sludge process, a contact stabilization process, a step aeration process, a high-rate aeration process, a rotating biological contactor process, a trickling filter process, and a contact oxidation process (e.g., as disclosed in *A Critical Review of Current Municipal Wastewater Treatment Technology. Phase I-Biological Treatment Methods*, Pacific Northwest Laboratories, Battelle Memorial Institute, July 1973).

In these microbial wastewater treatment processes, a large variety of microorganism in large numbers become a mass and resemble mud. Hence, the mass of microorganisms is termed "sludge". The above-described wastewater treatment processes using microorganisms can be roughly classified as a flotation process and fixed bed process depending on whether the sludge is suspended in an aeration tank or is retained in a fixed bed. The conventional activated sludge process, contact stabilization process and high-rate aeration process are considered flotation processes, and the contact oxidation process and trickling filter process are considered fixed bed processes.

The method in accordance with this invention can be described as a contact oxidation method. Generally, the contact oxidation process which employs an air diffuser or a mechanical aerator is superior in treating ability and treating efficiency to a mere fixed bed process, for example, the rotating biological contactor, for example, the process (e.g., as disclosed, for example, in Sadao Kojima, Yosui To Haisui (Industrial Water and Waste Water), 14, p. 960, (1972) and Y. Maeda, Journal of Fermentation Technology, 53, p. 875 (1975)).

The contact oxidation process is a process by which a certain supporting medium is placed in an aeration tank to grow microorganisms on the surface of the medium or both on the surface of and in the interstices of the medium, and by aeration aerobic microorganisms on the surface of the supporting medium and anaerobic microorganisms in the interstices thereof act to remove organic polluting matter in wastewater. This is also called a fixed bed aeration method. Various methods have been suggested and employed as to the structure, material and stacking of the supporting media to be disposed in the aeration tank, the manner of arrangement of the supporting media, etc. For example, a plastic cylinder having an inside diameter of about 25 to 75 mm, or a honeycomb-shaped block (i.e., a combination of a plurality of hexagonal cells) having an inside diameter of about 10 to 75 mm is suspended in an aeration tank, microorganisms are grown on the surface thereof, and aeration is performed (e.g., as disclosed in Sadao Kojima, Collection of Informative Materials for Techniques of Producing and Utilizing Regenerated Water, Fuji Technosystem Press (1974)). However, in wastewater treatment using such contact oxidation processes, microorganisms retained on the surface and inside of the supporting media frequently are sloughed off in the form of a mass or sheet, and cause a clogging of the inside of the cylindrical or honeycomb-shaped supporting ("sloughing-clogging phenomenon"). The occurrence of the sloughing-clogging phenomenon markedly reduces the water flow in the supporting media, namely at the fixed bed portion with microorganisms retained thereon. The contact oxidation process simultaneously utilizes the activities of aerobic microorganisms and anaerobic microorganisms. Generally, however, the action of removing polluting matter in wastewater is due primarily to aerobic microorganisms, and secondarily to anaerobic microorganisms. Thus, when the water flow is reduced by the sloughing-clogging phenomenon, polluting matter and dissolved oxygen in the waste water cannot be carried to a location where microorganisms having a treating ability are present. This immediately results in reduced treating ability or treating efficiency.

A method has also been suggested which involves treating organic polluting matter in wastewater using activated sludge which has been retained on and cultivated and filled in the open cells of pieces, usually with a size of 1 to 100 cm$^3$, of a spongy resin such as a polyurethane foam or a polyethylene foam, and thus has been converted to large particles having the size of the resin fragments (e.g., as disclosed in Japanese Patent Application (OPI) No. 64261/74). This method using spongy resin pieces, however, has the defect that the lifetime of the resin pieces as supporting media is about 2 years at the longest and it is difficult for them to hold microorganisms for long periods of time, and that, since many pieces float in the aeration tank, it is difficult to examine all of the individual pieces and exchange only those which have been worn out.

In microbial wastewater treatment, the microorganisms serve to remove organic polluting matter in the wastewater by absorbing, or oxidatively decomposing the matter. In the meantime, the microorganisms grow utilizing the polluting matter as a nutrient source, and frequently increase to a number more than necessary for the purpose of wastewater treatment. The excess is usually called excess sludge, and is discharged from the wastewater treatment system.

In almost all of the wastewater treatment processes using the activities of microorganisms, excess sludge occurs more or less, and, as a secondary problem of sewage disposal, large equipment, much labor and high costs must go into the treatment of the excess sludge. Thus, this constitutes one of the great defects of microbial wastewater treatment processes.

In an attempt to remedy this defect, methods have been employed in which the air flow rate is increased, or aeration is performed using highly pure oxygen, or the excess sludge is stored in a separate excess sludge tank and aerated for long periods of time (e.g., as disclosed in J. E. Ball, and M. J. Humenick "High-Purity Oxygen in Biological Treatment of Municipal Wastewater", Journal of Water Pollution Control Federation, 44, 65 (1972), T. D. Reynolds, "Aerobic Digestion of Waste Activated Sludge" Water Sewage Works, pp. 37 (Feb., 1967), etc.). These methods based on oxidation under aerobic conditions have the advantage of decreasing the excess sludge, but on the other hand, involve increased costs for power used to supply air or produce highly pure oxygen.

Generally, the fixed bed processes such as the rotating biological contactor process and contact oxidation process yield somewhat smaller amounts of excess sludge than the flotation processes such as the conventional activated sludge process or the contact stabilization process because, although the surface of the sludge adhering to the fixed bed is aerobic, the inside of the sludge is anaerobic, and the action of enzymes produced by the anaerobic microorganisms causes a digestion of the microbial cells. However, the amount of excess sludge produced is not small, and the fixed bed processes, too, are not free from the problem of treating the excess sludge.

SUMMARY OF THE INVENTION

An object of this invention is to provide an improved method for wastewater treatment and a unit therefor. Another object of this invention is to provide a method for wastewater treatment which can effectively eliminate $BOD_5$ and $COD_{Mn}$ (biochemical oxygen demand for 5 days and chemical oxygen demand measured by potassium permanganate) in wastewater and in which the maintenance of the process is simple, and a unit therefor.

Still another object of the invention is to provide a method for wastewater treatment in which large quantities of microorganisms can be retained on a supporting media and held there without sloughing off, and a unit therefor.

Still another object of this invention is to provide a method for wastewater treatment in which the treating device is not clogged by microorganisms and wastewater can be passed with good flow, and a unit therefor.

A further object of this invention is to provide a method for wastewater treatment in which the amount of excess sludge produced is small, and a unit therefor.

An additional object of the invention is to provide a method for wastewater treatment in which a supporting medium having good durability is used, and a unit therefor.

The present invention provides a method and a unit for wastewater treatment in which at least one non-woven fibrous mat having a three-dimensional network structure is disposed as supporting media in an aeration tank, microorganisms are retained on the surface of and in the interstices of the non-woven fibrous mat, and organic polluting matter in wastewater is oxidatively decomposed by the microorganisms in the presence of oxygen.

BRIEF DESCRIPTION OF THE ACCOMPANYING DRAWINGS

FIGS. 1-(A) and 1-(B) are microphotographs of a non-woven mat used in this invention, and FIG. 1-(C) shows the non-woven mat as a model;

FIG. 2-(A), FIG. 2-(B), FIG. 2-(C) and FIG. 2-(D) are a partly cut-away sectional view and a front elevation showing one example of a means for fixing the non-woven mat used in this invention;

FIGS. 3-(A) and 3-(B) are a plan view and a perspective view of another example of means for fixing the non-woven mat used in the present invention;

FIG. 4-(A) is a top plan view in a model of the arrangement of aeration tanks used in this invention, FIG. 4-(B) is a top plan view of an aeration tank, and FIG. 4-(C) is a view taken along the line A–B of FIG. 4-(A).

DETAILED DESCRIPTION OF THE INVENTION

The wastewater which can be treated in this invention comprises aqueous liquids which contain organic matter oxidatively decomposable by activated sludge in the presence of oxygen, such as industrial wastes containing organic compounds, and the supernatant liquid resulting after domestic wastewater is passed through a sedimentation tank.

The non-woven mat used in this invention, as shown in FIG. 1, is a non-woven mat which is obtained by processing synthetic fibers by heating them to cause the fiber to curl, arranging the curled fibers in a web or mat shape, and coalescing the fibers to one another using a bonding agent (e.g., of the same material as the fibers) or by melt adhesion upon heating, to form the curled fibers into a mat form. The non-woven mat has a three-dimensional network structure with the constituent fibers being intertwined irregularly, and with interstices having a large volume (e.g., about 60 to 99% by volume). One example of such a non-woven mat is commercially available under the tradename Saran Lock (a product of Dow Chemical).

Any synthetic fibers which are water proof, have superior physical and chemical properties and can be processed into the network structure described above can be used in the present invention. Examples of such fibers are fibers of nylon, polyvinylidene chloride, polyvinyl chloride, and polyesters. Fibers of metals having good corrosion resistance and rust resistance such as stainless steel can also be used.

The thickness of the fibers is generally about 50 to about 4,000 denier. If the thickness of the fibers is larger than about 4,000 denier, the retention of microorganisms on the three-dimensional network structure becomes somewhat poor, and the retaining microorganisms tend to be sloughed off due to the flow of the wastewater. If the thickness of the fibers decreases below about 50 denier, the strength of the fibers sometimes becomes too weak. The preferred thickness range is 100 to 2,000 denier, and the more preferred thickness range is 800 to 1,800.

The bulk density of the non-woven mat used in this invention is about 0.01 to about 0.40 $g/cm^3$, preferably 0.02 to 0.2 $g/cm^3$. If the bulk density becomes too high, the ability of the non-woven mat to hold microorganisms tends to decrease, and if it is extremely low, the retention of anaerobic microorganisms is reduced.

The thickness of the non-woven mat is a fairly important factor in view of the ability of the non-woven mat to hold sludge in a high concentration, and the rate of production of excess sludge. In order to decrease the rate of production of excess sludge based on $BOD_5$ removed, the thickness of the mat is preferably at least about 15 mm, although it may vary depending on the characteristics of the wastewater.

As previously stated, the present invention is also directed to a wastewater treatment process using microorganisms within the contact oxidation process, and in order to take advantage of both the activities of aerobic and anaerobic microorganisms, the thickness of the supporting media should be above a certain limit. Since, however, the removal of $BOD_5$ and $COD_{Mn}$ in wastewater treatment is generally due mainly to the activity of aerobic bacteria, the supporting media must have sufficient surface area ($a \times b \times c$ as shown in FIG. 1-(C)) to hold the aerobic bacteria necessary for wastewater treatment. If the thickness is too large, the number of supporting media which can be placed in an aeration tank must be reduced, and therefore, the total surface area of the supporting media decreases. Consequently, the loading of polluting matter on the surface area of the supporting media increases relatively, and the treating ability and the treating efficiency of the supporting media will be reduced. Preferably, the thickness of the supporting media is generally not more than about 30 mm. In addition, an excessive thickness results in a high material cost per unit surface area of the supporting media and is undesirable from the standpoint of the cost of constructing a wastewater treatment plant.

The thickness of the non-woven mat is usually about 15 to about 30 mm, and is suitably selected based on the characteristics of wastewater to be treated. The process for wastewater treatment with microorganisms by contact oxidation utilizes the activities of both aerobic microorganisms and anaerobic microorganisms to increase the treating ability and treating efficiency. Preferably, the characteristics of the wastewater to be treated should be fully considered, and when the treatment is performed mainly by the activity of aerobic microorganisms, the thickness of the non-woven mat is decreased. When the treatment is performed mainly by the activity of anaerobic microorganisms, the thickness of the non-woven mat is preferably increased.

Differences in the thickness of the non-woven mat cause some differences in the amount of microorganisms retained based on the apparent volume ($a \times b \times c$ as shown in FIG. 1) of the non-woven mat of a three-dimensional structure. Generally, the amount increases as the thickness is increased. For example, in a certain chemical plant wastewater treatment, the concentration of micro-organisms retained based on the apparent volume of a non-woven mat having a thickness of 10 mm is about 20,000 ppm, whereas the concentration of micro-organisms retained on the basis of the apparent volume of a non-woven mat having a thickness of 20 mm is about 30,000 ppm. Thus, the increasing of the thickness of the non-woven mat tends to increase the amount of microorganisms somewhat.

The shape of the non-woven mat may be any desired shape depending on the shape of the aeration tank, such as a square-shaped mat, and the size of the mat is also optional depending on the aeration tank. The surface of the non-woven mat may also be curved or have a zig-zag configuration.

When two or more non-woven mats are used in one aeration tank, it is generally desirable to arrange them parallel to one another in order to improve the water flow efficiency in the aeration tank and facilitate the carrying of polluting matter and dissolved oxygen in the wastewater to a location where the microorganisms for treatment are present. The spaces between the non-woven mats are preferably about 20 mm to about 100 mm in order to prevent clogging by sludge adhering to the surface layer portion of the mat or a part of the sludge that has been sloughed off. In the case of honeycomb-shaped or cylindrical supporting media, a part of the inside of the supporting media is frequently clogged, and as sludge builds up gradually, the inside is finally clogged completely. However, in the case of a plate-like supporting media, this drawback can be surely eliminated by selecting the spaces between the plates within a range of about 20 to about 100 mm. The reduction in the water flow in the contact oxidation process causes a reduction in treating ability and treating efficiency.

Preferably, the number of non-woven mats used is increased by minimizing the distance between the mats, but if the distance is below about 20 mm, the space between the mats tends to be clogged by microorganisms. If the space between the mats is larger than about 100 mm, the number of non-woven mats that can be filled in the aeration tank decreases, and the load of polluting matter per unit surface area increases relatively. Consequently, the treating ability and the treating effect are reduced.

Although bacterial found in activated sludge are predominantly Zooglea species, depending upon the characteristics of the wastewater, when filamentous bacteria such as those of Sphaerotilus species grow in the form of filaments on the surface of the supporting media and clog the spaces among the mats, it is necessary to perform a preliminary confirmation by using a small-sized test unit, etc. for examining the spaces among the mats, and then increase the spaces to prevent clogging in designing the unit to be actually used.

The range of the spaces between the non-woven mats, which depends, upon the type of wastewater to be treated, is preferably 25 to 70 mm, more preferably 40 to 60 mm.

The surface area of the non-woven mat is determined based on the amounts of $BOD_5$ and $COD_{Mn}$ to be treated.

Generally, a plurality of non-woven mats is set in an aeration tank parallel to the direction of water flow generated by aeration with an air diffuser. At times, the mats are fixed with bolts or the like. With respect to the spaces between the mats, if the aeration tank is divided into four compartments, it is possible, for example, to adjust the space between the mats in the first and second compartments to 50 mm, and those in the third and fourth compartments to 40 mm. When there is not much difference in the adhesion conditions of the microorganisms, the mats may be arranged at equal intervals.

When wastewater to be treated and activated sludge are introduced into the aeration tank and oxygen or an oxygen-containing gas, generally air, is supplied into the tank by, for example, an air diffuser to cause water flow, microorganisms adhere to and fill and further grow in the internal open spaces of the non-woven mats with a relatively short acclimation period. The period of acclimation denotes the period which lapses until the supporting media begins to exhibit its performance in the aeration tank; in other words, the period which lapses until the properties of activated sludge capable of biochemically oxidizing polluting matter in the wastewater attain a steady state in the supporting media and the amount of the retained activated sludge becomes sufficient for wastewater treatment. The period can be determined by measuring the BOD of the treated wastewater.

The amount of microorganisms retained in the supporting material in accordance with this invention is usually as high as about 25,000 to 50,000 ppm based on the apparent volume of the supporting media, although it differs somewhat depending, for example, on the characteristics of the wastewater to be treated, and the thickness of the supporting media.

The treatment of the wastewater is carried out by introducing the wastewater into the aeration tank, and simultaneously feeding oxygen, air or another oxygen-containing gas into the wastewater using an air diffuser, etc. thereby to oxidize organic polluting matter in the wastewater. The oxygen-containing gas is a mixture of oxygen with a gas inert to oxidation, such as nitrogen, carbon dioxide, neon, argon, krypton or xenon. Generally, air is used for the oxidation reaction.

The oxygen, air or oxygen-containing gas is fed into the aeration tank so that the concentration of dissolved oxygen in the tank is kept between about 0.5 to about 15 ppm, although it depends upon the concentrations of $BOD_5$ and $COD_{Mn}$ in the wastewater. When the concentration of polluting matter in the wastewater to be treated is high near the inlet end of the aeration tank, the amount of dissolved oxygen tends to decrease markedly. In such a case, the treating ability and the treating effect may be improved by using a so-called tapered aeration method in which the aeration tank is partitioned into compartments, and the air flow rate is increased at the first compartment and is decreased progressively in the subsequent compartments.

In the presence of oxygen, the wastewater flows through the open spaces inside the non-woven mats and the spaces between the non-woven mats, and during the passage, is subjected to the action of aerobic microorganisms on the surfaces of the non-woven mats and the action of anaerobic microorganisms inside the non-woven mats. Consequently, organic polluting matter in the wastewater is absorbed by the microorganisms and then decomposed. The excess microorganisms formed as a result of growth are sloughed off from the non-woven mats and suspended in the sewage. Thus, these excess microorganisms may sometimes be decomposed by the microorganisms retained on the non-woven mats in the subsequent compartment. The treated sewage flowing from the aeration tank is introduced into a sedimentation tank where the sludge is separated by sedimentation. The clear water is then discharged. The sludge separated in the sedimentation tank does not need to be returned to the aeration tank, and after water removal, is discarded or incinerated. Since, however, the rate of production of excess sludge is low and its amount is very small, it can be treated simply. It is, of course, possible to return the sludge to the aeration tank as is the case with the current practice.

The non-woven mats can be fixed using suitable methods. For example, as shown in FIGS. 2-(A) and 2-(B), spacers 1 are formed each of which consists of a cylindrical portion 2, a ring-like collar 3 formed integrally on the periphery thereof at about its center in the axial direction, and a plurality of projections 4 formed on the sides of the collar 3 and having an arrow-shaped tip. Two such spacers 1 are set face to face, and a non-woven mat 5 is interposed between them. The projections 4 pierce through the non-woven mat 5. In this manner, a plurality of non-woven mats 5 are arranged parallel to each other at predetermined intervals, and a through bolt 6 is inserted in a shaft hole 1a of the spacers 1, and support plates 7 and 8 are secured to both ends of the through bolt 6. A nut 9 is secured at both ends to fix the non-woven mats 5 and the support plates 7 and 8. Further, the edge portions of the non-woven mats 5, etc. are reinforced by reinforcing plates 10 and 11, and the resulting assembly is disposed in an aeration tank.

Another embodiment of fixing the non-woven mats is shown in FIGS. 3-(A) and 3-(B). The peripheral edge portion of a non-woven mat 19 is covered and reinforced with a pipe 12, and a plurality of plastic bands 13 are stretched over the mat in the longitudinal and transverse directions with both ends fixed by a fixture 14 to fix the non-woven mat 19 and the pipe 12 integrally. Further, the pipe 12 is supported by angle members 16 secured to the inside surface of a square frame 15 at predetermined intervals. Thus, the non-woven mats 19 arranged in the frame 15 can be disposed in parallel and fixed at predetermined intervals. In FIG. 3-(B), the reference numeral 17 represents a support plate, and 18 represents a supporting rod fixed to the support plate 17 and the frame 15.

Thus, non-woven mats 19 which are spaced in parallel to each other at predetermined intervals and fixed by using the through bolt 6 and spacers 1 as in FIG. 2, or by using the plastic bands 13 and the angle members 16 as in FIG. 3 are supported and fixed in the aeration tank, and used for treating organic polluting matter in the wastewater.

FIG. 4 shows an aeration tank for wastewater treatment which is used in the method of this invention. FIG. 4-(A) shows the arrangement of four aeration tanks; FIG. 4-(B) is a top plan view of one of these tanks; and FIG. 4-(C) is a sectional view taken along the line A-B of FIG. 4-(A). In FIGS. 4, 20, 20', 20" and 20''' each represents aeration tanks; 21, supporting media in accordance with the invention; 22, an air-diffuser; 23, a frame for fixing the supporting media; and 24, a flow controlling plate provided so as to cause the wastewater to flow in the direction indicated by the arrow. In FIG. 4-(A), wastewater flows from tank 20 to 20''' and in the direction indicated by the arrow while it is being treated. Finally the wastewater is introduced into the sedimentation tank from 20'''. Generally, the air diffuser is so provided that the water flow is spiral and the position of its installation can be freely selected. If desired, the flow control plate is not used.

In FIG. 4, supporting media are disposed in two rows a and b. This is not particularly different from the case of disposing them in one row, and they may also be arranged in three, four or more rows.

Since in the present invention, non-woven mats having a three dimensional network structure are disposed as supporting media in an aeration tank, and microorganisms are retained on the surfaces and the interstices of the mats, the $BOD_5$, $COD_{Mn}$, and a part of excess sludge can be effectively eliminated by the synergistic action of aerobic microorganisms on the surfaces of the non-woven mats and anaerobic microorganisms in the interstices of the mats. Furthermore, since the non-woven mat has open spaces of a relatively large volume and a three dimensional network structure having the constituent fibers interlaced irregularly, large amounts of microorganisms can be held in the non-woven mats without allowing them to be sloughed off easily. Accordingly, wastewater can be treated by this invention under conditions of higher BOD loadings, for example about 1.0 to about 2.5 kg $BOD/m^3/day$ (amount of BOD in wastewater fed per day per $m^3$ of the aeration tank), than the conventional activated suludge process. Moreover, because the spaces between the non-woven mats are not clogged, the flow of wastewater through the spaces between the non-woven mats and through the interstices of the non-woven mats is good, and the wastewater can be contacted easily, surely and sufficiently with all of the microorganisms held in the non-woven mats, thereby eliminating organic polluting matter in the wastewater efficiently. Moreover, since microorganisms are surely retained on the non-woven mats, the concentration of sludge in the aeration tank is maintained always constant. The rate of production of excess sludge is extremely low, and the excess sludge can be treated easily. Also, it is not necessary to return the sludge to the aeration tank. Thus, the maintenance of the unit is easy, and wastewater can be treated economically. Furthermore, the size of the unit can be small, and the cost of constructing a wastewater treatment plant can be reduced, because wastewater can be treated by the invention efficiently and rapidly and the same or higher treating efficiency than conventional techniques can be obtained with an aeration tank of a smaller capacity.

The non-woven mats can be fixed in parallel to each other at predetermined intervals and can be disposed fixedly in an aeration tank. The arrangement of the non-woven mats can be freely changed depending on the specifications of the unit, the treating conditions, etc., and exchanging of the non-woven mats can be done simply. Accordingly, the non-woven mats can be arranged in the aeration tank in such a manner that wastewater treatment can be performed under optimum treating conditions.

Another advantage of the invention is that the retention of microorganisms on the supporting media is accomplished rapidly, and the filling material has a long lifetime (generally 5 to 10 years) and surely retains microorganisms over long periods of time. Furthermore, wastewater can be treated always under optimum conditions by partitioning the aeration tank, and by using a method such as stepped aeration (for example, as shown in FIG. 4, wastewater is fed to tanks 20', 20" and 20''' at a volume ratio of 5:3:2 in order to reduce the volumetric loading in tank 20), or tapered aeration (air is fed to the tanks in varying proportions).

The following Examples regarding wastewaters from a chemical plant, wastewaters from an iron foundry, and domestic wastewater, etc. illustrate the present invention more specifically. It should be noted that the invention is not to be considered as being limited to these Examples. Unless otherwise indicated, all parts, percents, ratios and the like are by weight.

EXAMPLE 1

A chemical plant waste (containing polyalcohols and some amines) containing a $BOD_5$ (the oxygen demand of BOD matter at 20° C. for 5 days) of 750 ppm and a $COD_{Mn}$ of 510 ppm as polluting matter was treated using a unit of the type shown in FIG. 4. One non-woven mat was disposed in each of the tanks.

First, phosphoric acid and urea were added as a nutrient source so that the weight ratio of $BOD_5$: N:P became 100:5:1. The pH of the wastewater was adjusted to 7 to 7.5 with sulfuric acid. The wastewater was introduced into the aeration tank, and as a seed sludge, 2000 ppm of sludge resulting from the activated sludge treatment of sewage was added. The period of acclimation was 15 days.

After retaining the microorganisms in the non-woven mats in this way, the waste water was biochemically treated under a $BOD_5$ volumetric loading of 1.4 kg-$BOD_5/m^3$/day (the surface area loading of the non-woven mat was 0.05 kg-$BOD_5/m^2$/day).

For comparison, the above wastewater was treated in the same way as above using the conventional activated sludge process.

Table 1 summarizes the specifications of the treating units, and Table 2 shows the results of the treatments obtained.

Table 1

| Specifications of the Treating Unit | | |
|---|---|---|
| Item | Invention | Comparison (conventional activated sludge process) |
| Capacity of Aeration Tank (l) | 2.5 | 10 |
| Number of Aeration Tanks (one non-woven mat was disposed in each tank) | 4 | 1 |
| Total Capacity of Tanks (l) | 10 | — |
| Capacity of Sedimentation Tank (l) | 5 | 10 |
| Number of Sedimentation Tanks | 1 | 1 |
| Surface Area of Non-woven Mat in the Tank ($m^2$) | 0.28 | — |
| Material of Non-woven Mat | nylon(**) | — |
| Thickness of Non-woven Mat (mm) | 20 | — |
| Temperature (°C.) | 20 | 20 |
| Concentration of MLSS(*) (mg/l) | — | 3000 |
| Flow Rate of Waste Water (l/day) | 19 | 19 |
| Flow Rate of Air (l/min) | 15 | 15 |

(*)Concentration of mixed liquor suspended solids (which can be regarded as the same as the concentration of activated sludge).
(**)(bulk) density 0.5 g/cm³, 1700 denier)

Table 2

| | | Results of the Treatments | | | | | |
|---|---|---|---|---|---|---|---|
| | | $BOD_5$ | | $COD_{Mn}$ | | Volumetric Loading | Surface Area Loading |
| Run | Analysis Location | ppm | Percent Removal | ppm | Percent Removal | (Kg-$BOD_5$/$m^3$/day) | (Kg-$BOD_5$/$m^2$/day) |
| Invention | | | | | | | |
| | Aeration Tank No. 1, Effluent | 168 | 77.6 | 210 | 58.8 | 5.6 | 0.20 |
| | Aeration Tank No. 2, Effluent | 72 | 81.3 | 140 | 72.5 | 2.8 | 0.10 |
| | Aeration Tank No. 3, Effluent | 17 | 97.7 | 100 | 80.3 | 1.9 | 0.07 |
| | Aeration Tank No. 4, Effluent | 10 | 98.6 | 76 | 85.0 | 1.4 | 0.05 |
| | Effluent of Sedimentation Tank | 11 | 98.5 | 76 | 85.0 | 1.4 | — |
| Comparison | | | | | | | |
| | Effluent of Sedimentation Tank | 19 | 97.4 | 115 | 77.4 | | |

(Note 1) In the comparison (conventional activated sludge process), the weight ratio of the sludge returned was 50%. In the invention, the sludge was not returned.

The above results show that according to the method of this invention using non-woven mats, the treating efficiency at the outlet of the third aeration tank is more than that obtained in the standard activated-sludge process, and that when it is desired to reduce the $BOD_5$ to less than 20 ppm, the capacity of the aeration tank can be reduced by about 35% from that in the conventional activated sludge process.

The rate of production of excess sludge is less than 3% based on the $BOD_5$ removed in the method of this invention, whereas it is 35% in the conventional activated sludge process. It can thus be ascertained that according to the method of this invention, the rate of production of excess sludge is very small, and the method is excellent also with respect to excess sludge treatment.

EXAMPLE 2

A coke oven waste flashing liquor (main components being ammonia, phenol and thiocyanogen) containing a $BOD_5$ of 1050 ppm and a $COD_{Mn}$ of 1500 ppm as polluting matter was treated both using non-woven mats for holding microorganisms (the method of this invention), and using the conventional activated sludge process (comparison) while the volume load of the aeration tank was made the same for both, in order to compare the effects of removing $COD_{Mn}$ matter.

The treating unit was the same as that used in Example 1, and the microorganisms were retained in the non-woven mats in the same manner as in Example 1.

Table 3 summarizes the treating conditions, and Table 4 shows the results of the treatments obtained.

Table 3

| Treating Conditions | |
|---|---|
| Invention | |
| $cod_{Mn}$ Volumetric Loading | 2.0 Kg-$COD_{Mn}/m^3$/day |
| $BOD_5$ Volumetric Loading | 1.4 Kg-$BOD_5/m^3$/day |
| Capacity of Aeration Tank | 2.5 liters |
| Number of Aeration Tanks (one non-woven mat was disposed in each tank) | 4 |
| Ratio of Sludge Returned | 0% (no return of sludge) |
| Flow Rate of Waste Liquor | 13.7 liters/day |
| Surface Area Loading of Non-woven Mat | 0.05 Kg-$BOD_5/m^3$/day |
| Material of Non-woven Mat | Polyvinylidene chloride (bulk density 0.05 g/$cm^3$; 1700 denier |
| Thickness of the Non-woven Mat | 15 mm |
| Flow Rate of Air | 15 liters/min. |
| Temperature | 20° C. |
| Comparison | |
| $COD_{Mn}$ Volumetric Loading | 2.0 Kg-$COD_{Mn}/m^3$/day |
| $COD_{Mn}$ SS Loading (*1) | 0.41 Kg-$COD_{Mn}$/SS/day |
| $BOD_5$ Volumetric Loading | 1.4 kg-$BOD_5/m^3$/day |
| $BOD_5$ SS Loading (*2) | 0.27 Kg-$BOD_5$/SS/day |
| Concentration of MLSS | 5200 ppm |
| Capacity of Aeration Tank | 10 liters |
| Capacity of Sedimentation Tank | 10 liters |
| Ratio of Sludge Returned | 100% |
| Flow Rate of Waste Water | 13.7 liters/day |
| Flow Rate of Air | 15 liters/min. |
| Temperature | 20° C. |

(*) and (*2): $COD_{Mn}$ or $BOD_5$ of wastewater fed per day per unit amount (1 Kg in this case) of activated sludge in the conventional activated sludge process.

Table 4

| | Results of Treatment | |
|---|---|---|
| Run | $COD_{Mn}$ (ppm) | Percent Removal |
| Invention | | |
| Influent Liquor | 1500 | |
| Aeration Tank No. 1, Effluent | 475 | 68.3 |
| Aeration Tank No. 2, | 155 | 89.7 |
| Aeration Tank No. 3, Effluent | 144 | 90.4 |
| Aeration Tank No. 4 Effluent | 130 | 91.3 |
| Comparison | | |
| Influent Liquor | 1500 | |
| Treated Liquor | 240 | 84.0 |

The above results show that according to the treating method of this invention, the removal rate of $COD_{Mn}$ matter of the effluent of the second aeration tank was more than that in the conventional activated sludge process. This means that even when the capacity of the aeration tank is reduced to half of that in the conventional activated sludge process, it is possible to obtain a greater effect of removing $COD_{Mn}$ matter than in the conventional activated sludge process. It is noted, therefore, that in the present invention, the cost of constructing the treating unit is low, and the treating method of this invention is economically advantageous.

The rate of occurrence of excess sludge was 30% based on the BOD removed in the case of the conventional process, whereas it was 2% in the method of this invention. It can be seen therefore, that the present invention is advantageous with regard to excess sludge treatment, too.

EXAMPLE 3

A domestic wastewater was treated under the following conditions using the unit shown in FIG. 4 using non-woven mats for retaining microorganisms. The results obtained are shown in Table 5. The domestic wastewater was a supernatant liquid obtained after passing through a sedimentation tank. The microorganisms were retained in the non-woven mats in the same manner as in Example 1.

| Treating Conditions | |
|---|---|
| Flow Rate of Wastewater | 50 $m^3$/day |
| Quality of Influent Water | |
|   pH | 5.80 |
|   $BOD_5$ | 175 ppm |
|   $COD_{Mn}$ | 62 ppm |
| Volumetric Loading | 1.2 Kg-$BOD_5/m^3$/day |
| Surface Area Load of Non-woven Mat | 0.05Kg-$BOD_5/m^2$/day |
| Temperature | 15° C. |
| Flow Rate of Air | 400 liters/min. |

Table 5

| | Results of the Treatments | | | | |
|---|---|---|---|---|---|
| | Influent Waste-water | Effluent of Aeration Tanks | | | |
| | | No. 1 | No. 2 | No. 3 | No. 4 |
| pH | 5.8 | 6.4 | 6.7 | 7.0 | 7.1 |
| $COD_{Mn}$ (ppm) | 62 | 21 | 11 | 8 | 7 |
| $BOD_5$ (ppm) | 175 | 38 | 12 | 7 | 5 |
| Percent Removal of $BOD_5$ | — | 78.2% | 93.1% | 96.0% | 97.1% |

The results show that the treating effect of the method of this invention was very good in spite of the fact that the volumetric loading was considerably higher than that in the conventional activated sludge process in general use. The rate of occurrence of excess sludge was less than 3% based on the BOD₅ removed, and was markedly lower than in the case of the conventional activated sludge process.

EXAMPLE 4

Wastewater drained from a construction site which contained sodium glycolate as a main source of pollution was treated by using a unit of the type shown in FIG. 4. The results of analysis of the wastewater are shown in Table 6.

Table 6

| Analysis Item | Analytical Value |
| --- | --- |
| pH | 10.0 |
| BOD$_5$ (ppm) | 250 |
| COD$_{Mn}$ (ppm) | 225 |
| SS (ppm) | 28 |
| Total Nitrogen (ppm) | 2.5 |
| Phosphorus (ppm) | 0.8 |
| Ca (ppm) | 105 |
| CiO$_2$ (ppm) | 182 |

The above wastewater was treated using the testing unit having the specifications shown in Table 7 in an attempt to reduce the BOD₅ to 20 ppm or less.

Table 7

| Item | Specification |
| --- | --- |
| Available Volume of Aeration Tanks* | 0.754 m³ |
| Total Surface Area of Non-woven Mats | 12 m² |
| Number of Non-woven Mats (six per tank) | 24 |
| Total Number of Aeration Tanks | 4 |

*The available volume of the aeration tanks was the total available volume of the four tanks.

Prior to the treatment, phosphoric acid and urea were added to the wastewater having the composition shown in Table 6 as phosphorus and nitrogen nutrient sources. The weight ratio of BOD₅:N:P at this time was adjusted to 100:5:1. The pH of the wastewater was adjusted to 7 with sulfuric acid.

The non-woven mats as supporting media were prepared from polyvinylidene fibers (170 denier), and had a bulk density of 0.06 g/cm³ and a thickness of 20 mm.

In order to examine the effect of the spaces between the non-woven mats on the treating effect, two sets of testing units having the specifications shown in Table 7 were made. In one of them, the distance between two adjoining non-woven mats was adjusted to 10 mm, and in the other, the distance was adjusted to 30 mm. The flow rate of the wastewater was such that on the basis of the available volume of the aeration tanks, the volumetric loading was 1.2 kg-BOD₅/m³/day, and the surface area load of the non-woven mat was 75 kg-BOD₅/m²/day. The flow rate of air was 55 liters/minutes.

Prior to the treatment, the return sludge in the unit for treating domestic wastewater by the activated sludge process was added to the wastewater as a seed sludge so that the concentration of sludge in the aeration tank was about 1500 ppm.

The above wastewater which contained the nutrient sources and whose pH was adjusted to 7 as described hereinabove was used, and after an acclimation period of 15 days, the treating effects were compared. The results obtained are shown in Table 8 below.

Since the effect of temperature on the treating effect was great in the biochemical wastewater treatment, the temperature of the wastewater was maintained at 14° C. using a temperature controller in both of these testing units throughout the testing period.

Table 8

Comparison of the Effect of the Spaces between the Non-woven Mats on the Treating Effect
(Analysis of the treated water)

| Item | Space between Mats (30 mm) | Space between Mats (10 mm) |
| --- | --- | --- |
| BOD$_5$(ppm) | 3 | 32 |
| COD$_{Mn}$ (ppm) | 6 | 45 |
| Rate of Production of Excess Sludge based on Removed BOD$_5$(%) | 25 | 10.5 |

As shown in Table 8, the treating effect on BOD₅ and COD$_{Mn}$ was better when the space between the mats was 30 mm. It was noted that in addition to the effect of removing BOD₅ and COD$_{Mn}$, the rate of production of excess sludge was low when the space between the mats was 30 mm, thus showing an excellent advantage.

The differences in treating effect are presumably because when the space between the non-woven mats was adjusted to 10 mm, microorganisms, which grew as the acclimation period progressed, clogged the space in the first and second tanks and the flow of the wastewater through the space between the mats was markedly obstructed. On the other hand, when the space between the mats was 30 mm, fairly large quantities of microorganisms grew on the surfaces of and in the interstices of the non-woven mats, but did not clog the spaces between the non-woven mats.

In the unit in which the space between the mats was 30 mm, most of the microorganisms were fixed to the surfaces and the inside of the non-woven mats, and the amount of activated sludge floating in the aeration tank was very small. In spite of the fact that fairly strong aeration was performed through an air-diffusion pipe so as to maintain the level of dissolved oxygen in the tank at about 6 to 7 ppm and the flow of the wastewater through the spaces between the non-woven mats was quite fast, the microorganisms adhering to the mats scarcely sloughed off.

EXAMPLE 5

In order to examine the influence of the space between non-woven mats on the treating effect when the BOD₅ was relatively high, a chemical plant waste containing polyalcohols and some amounts of amines was treated using non-woven mats.

The composition of the wastewater analyzed was as shown in Table 9.

Table 9

| Analysis Item | Analysis Value |
| --- | --- |
| pH | 6.6 |
| BOD$_5$ (ppm) | 845 |
| COD$_{Mn}$(ppm) | 460 |
| Total Nitrogen (ppm) | 5 |
| Phosphorus (ppm) | 0.5 |

The same nutrient sources as described in Example 4 were added to the waste water.

In order to examine the influence of the space between the mats on the treating effect, a comparative experiment was performed using two sets of testing devices having the specifications shown in Table 10 below.

Table 10

| Item | Specification |
| --- | --- |
| Total Available Volume of Aeration Tanks | 0.754 m³ |
| Total Surface Area of Non-woven Mats | 10 m² |
| Number of Non-woven Mats (5 per tank) | 20 |
| Number of Aeration Tanks | 4 |
| Material of Non-woven Mats | Same as in Example 4 |

The space between the mats in one device was adjusted to 40 mm and that in the other to 15 mm, since it was anticipated that the retention of microorganisms would increase because of the higher $BOD_5$ wastewater to be treated than in Example 4. A seed sludge was added so that the concentration of sludge in the aeration tank became 1500 ppm as in Example 1. After an acclimation period of 15 days, the qualities of the treated wastewaters were compared.

The amount of the wastewater in both experimental units was adjusted so that on the basis of the available volume of the aeration tanks, the volumetric loading was 20 kg-$BOD_5/m^3$/day, and the surface area loading of the non-woven mats was 150 g-$BOD_5/m^2$/day. The flow rate of air was 130 liters/min.

The results of analysis of the treated waters are shown in Table 11 below. When the space between the non-woven mats was adjusted to 40 mm, the treating effect was excellent despite the fact that the surface area loading of the non-woven mats was 150 g-$BOD_5/m^2$/day which was quite high for a general microbiological wastewater treatment process using contact oxidation.

Table 11

Results of Analysis of Treated Water (temperature of water 20° C.)

| Item | Space between Mats (40 mm) | Space between Mats (15 mm) |
| --- | --- | --- |
| $BOD_5$ (ppm) | 30 | 210 |
| $BOD_5$ percent removal | 96.4 | 75.1 |
| $COD_{Mn}$ (ppm) | 58 | 194 |

When the space between the mats was adjusted to 15 mm, the spaces between the non-woven mats were clogged by microorganisms as in Example 4, and the flow of the wastewater through the spaces among the non-woven mats decreased. This was presumed to be the cause of the reduced treating effect. In the device in which the space between the mats was adjusted to 40 mm, the $BOD_5$ of the water at the outlet of the second aeration tank was 220 ppm which was substantially the same as in the treated water in the device in which the space between the mats was 15 mm. This shows that the treating ability of the unit increases when the space between the mats is adjusted to an appropriate value to prevent clogging.

EXAMPLE 6

The wastewater treatment method of this invention using non-woven mats was compared with another type of microbial wastewater treatment using contact oxidation employing honeycomb-shaped blocks.

The same chemical plant waste as described in Example 5 was treated using a testing unit constructed by modifying the testing unit used in Example 5 as indicated below. The units were designed such that when the volume loading of the testing unit was set at 1.0 kg-$BOD_5/m^3$/day, the surface area load of the supporting media was 7.5 g-$BOD_5/m^2$/day for the method of this invention and 30 g-$BOD_5/m^2$/day for the honeycomb-shaped supporting media.

Table 12

Specifications of Testing Units

| Item | Specification of Unit of this Invention | Specification of Honeycomb-type Unit |
| --- | --- | --- |
| Total Available Volume of Aeration Tanks | 0.754 m³ | 0.754 m³ |
| Number of Aeration Tanks | 4 | 4 |
| Type of Supporting Media | Non-woven mats | Honeycomb-shaped blocks (13 mm in inside diameter and 50 cm in length) |
| Number of Filling Materials | 20 (5 per tank) | 4 |
| Space between Supporting Media | 40 mm | 1 block for each tank |
| Total Surface Area of Supporting Media | 10 m² | 25 m² (inside and outside) |
| Flow Rate of Air | 55 liters/min. | |

Acclimation was performed for 15 days in the same manner as described in Example 5 using a chemical plant waste having the same composition as described in Example 5. The temperature of the waste water in the aeration tanks was adjusted to 15° C. using a temperature controlling device.

In the case of the method of this invention microorganisms were retained on the surfaces and insides of the supporting media as the acclimation period progressed and scarcely separated. In the honeycomb-shaped blocks, some separation of the microorganisms was observed. The microorganisms which sloughed off stacked on the top portion of the honeycomb-shaped blocks while suspended in the aeration tanks, and a considerable clogging phenomenon was observed toward the end of the acclimation period. Thus, the water flow inside the honeycomb-shaped blocks tended to become poor.

After the end of the acclimation period, the treated wastewaters were analyzed, and the results obtained are shown in Table 13 below.

Table 13

| | Method of this Invention | | Method Using Honeycomb-shaped Blocks | |
| --- | --- | --- | --- | --- |
| Item | Effluent of Aeration Tank No. 3 | Effluent of Aeration Tank No. 4 | Effluent of Aeration Tank No. 3 | Effluent of Aeration Tank No. 4 |
| $BOD_5$(ppm) | 10 | 4 | 60 | 23 |
| Percent | | | | |

Table 13-continued

| | Method of this Invention | | Method Using Honeycomb-shaped Blocks | |
|---|---|---|---|---|
| Item | Effluent of Aeration Tank No. 3 | Effluent of Aeration Tank No. 4 | Effluent of Aeration Tank No. 3 | Effluent of Aeration Tank No. 4 |
| Removal of $BOD_5$ | 98.8 | 99.5 | 92.9 | 97.3 |

As shown in Table 13, the treating efficiency was somewhat poor in the case of using honeycomb-shaped blocks with which clogging was observed.

The poorer $BOD_5$-removing efficiency in aeration tank No. 4 in the case of the honeycomb-shaped blocks in comparison with that in aeration tank No. 3 in the method of this invention means that the sloughing-clogging phenomenon reduces not only the treating effect but also the treating ability of the supporting media.

EXAMPLE 7

In order to compare treating effects, sewage was treated in a laboratory-scale small-sized testing unit using non-woven mats having a bulk density of 0.05 g/cm³ (the method of this invention), and polyurethane foam supporting media (comparison).

The specification of the test unit used is shown in Table 14 below.

Table 14

| Item | Testing Unit of the Invention | Testing Unit including Polyurethane Foam Filling Material |
|---|---|---|
| Capacity of Aeration Tank | 2.5 liters | 2.5 liters |
| Number of Aeration Tanks | 4 | 4 |
| Total Capacity of Tanks | 10 liters | 10 liters |
| Capacity of Sedimentation Tank | 5 liters | 5 liters |
| Number of Sedimentation Tanks (without rake) | 1* | 1 |
| Apparent Surface Area of Supporting Media | 0.28 m² | 0.28 m² |
| Material of Supporting Media | Polyvinylidene Chloride non-woven mats (170 denier; bulk density 0.05 g/cm³) | Polyurethane foam mats (bulk density 0.103 g/cm³) |
| Thickness of Supporting Media | 20 mm | 20 mm |
| Temperature | 20° C. | 20° C. |

The testing units were the same except that the non-woven mats were used as supporting media in one of them and the polyurethane foam mats in the other.

The chemical plant waste used in Example 1 which contained a $BOD_5$ of 750 ppm and a $COD_{Mn}$ of 510 ppm was used, and as a seed sludge, 1500 ppm of return sludge in an activated-sludge unit for treatment of domestic wastewater was added. After an acclimation period of 15 days, the treating effects were compared, and the results obtained are shown in Table 15 below.

More specifically, the chemical plant waste was adjusted to a pH of 7–7.5, and then the amount of the influent wastewater was adjusted during the test so that in both of the test units, the volume load became 1.4 kg-BOD/m³/day, and the surface area load of the filling material (based on the apparent surface area) was 50g-BOD/m²/day. The flow rate of air was 15 liters/min., and the temperature was maintained at 20° C.

Prior to the measurement of the rate of production of excess sludge, the sludge settled in the sedimentation tank was removed to empty the tank. Then, the excess sludge which passed from the aeration tank was accumulated for 10 days. Then, the sludge was withdrawn, and the amount of dry sludge was measured by a conventional method (method as described in JIS K 0102). From the amount of $BOD_5$ which was removed over the period of 10 days, the rate of occurrence of excess sludge based on the $BOD_5$ removed was determined.

The treating effects and the rates of production of excess sludge are shown in Tables 15 and 16 below.

Table 15

Comparision of Treating Efficiencies due to Differences in Supporting Media

| | Analysis Location | $BOD_5$ | | $COD_{Mn}$ | | Volume Load (Kg-$BOD_5$/m³/day) | Surface Load (g-$BOD_5$/m²/day) |
|---|---|---|---|---|---|---|---|
| | | ppm | Percent Decrease | ppm | Percent Decrease | | |
| Polyvinylidene Chloride Non-woven Mat | Effluent of Aeration Tank No. 1 | 172 | 77.1 | 201 | 60.6 | 5.60 | 200 |
| | Effluent of Aeration Tank No. 2 | 78 | 89.6 | 135 | 73.5 | 2.80 | 100 |
| | Effluent of Aeration Tank No. 3 | 19 | 97.5 | 62 | 87.8 | 1.87 | 67 |
| | Effluent of Aeration Tank No. 4 | 8 | 98.9 | 38 | 92.5 | 1.40 | 50 |
| | Effluent of Sedimentation Tank | 8 | 98.9 | 35 | 93.1 | | |
| Polyurethane Foam Mat | Effluent of Aeration Tank No. 1 | 225 | 70.0 | 230 | 54.9 | 5.60 | 200 |
| | Effluent of Aeration | 98 | 86.9 | 153 | 70.0 | 2.80 | 100 |

Table 15-continued
Comparision of Treating Efficiencies due to Differences in Supporting Media

| Analysis Location | BOD$_5$ ppm | BOD$_5$ Percent Decrease | COD$_{Mn}$ ppm | COD$_{Mn}$ Percent Decrease | Volume Load (Kg-BOD$_5$/m$^3$/day) | Surface Load (g-BOD$_5$/m$^2$/day) |
|---|---|---|---|---|---|---|
| tion Tank No. 2 Effluent of Aeration Tank No. 3 | 35 | 95.3 | 84 | 83.5 | 1.87 | 67 |
| Effluent of Aeration Tank No. 4 | 19 | 97.4 | 61 | 88.0 | 1.40 | 50 |
| Effluent of Sedimentation Tank | 20 | 97.3 | 59 | 88.4 | | |

Table 16
Comparison of the Rate of Production of Excess Sludge due to Differences in Supporting Media

| Type of Supporting Media | Rate (%) of Occurrence of Excess Sludge based on BOD$_5$ Removed |
|---|---|
| Polyvinylidene Chloride Non-woven Mats | 1.8 |
| Polyurethane Foam Mats | 4.5 |

As shown by the results in the above table, the treating efficiency was superior when the non-woven mats were used. The rate of production of excess sludge based on the BOD$_5$ removed was lower when the non-woven mats were used. From this point also, the non-woven mats exhibited superior performance.

After the test, the supporting media in the testing units were removed, and the amount of sludge retained on the surfaces and interstices of the supporting media was measured. In the case of the non-woven mats, the amount of the retained sludge was about 35,000 ppm based on the apparent volume of the non-woven mats. In the case of the polyurethane foam mats, the amount of the sludge was about 22,000 ppm based on the apparent volume of the polyurethane foam mats. Thus, some difference is observed between them with regard to the ability to hold sludge, and it is presumed that this difference affected the treating effect and the rate of production of excess sludge.

EXAMPLE 8

Using the same chemical plant waste as described in Example 1 and the same laboratory-scale small-sized testing units as described in Example 7, the influence of the difference in the thickness of the non-woven mats on the treating effect and the rate of occurrence of excess sludge was examined. The results obtained are shown below.

The specifications of the testing units used in this example are shown in Table 17 below.

Table 17
Specifications of the Testing Unit

| Item | Specification |
|---|---|
| Capacity of Aeration Tank | 5.0 liters |
| Number of Aeration Tanks | 4 |
| Total Capacity of Aeration Tanks | 20 liters |
| Capacity of Sedimentation Tank | 10 liters |
| Number of Sedimentation Tanks (without rake) | 1 |
| Apparent Surface Area of Filling Material | 0.20 m$^2$ |
| Material of Supporting Media | Polyvinylidene chloride non-woven mats (700 denier fibers; bulk density 0.05 g/cm$^3$) |
| Thickness of the Supporting Media | |
| Testing Unit No. 1 | 10 mm |
| Testing Unit No. 2 | 15 mm |
| Testing Unit No. 3 | 20 mm |
| Testing Unit No. 4 | 30 mm |

Four sets of testing units in which the thicknesses of the supporting media were different as shown in Table 17 above were made. In the same manner as in Example 7, a chemical plant waste containing a BOD$_5$ of 756 ppm and a COD$_{Mn}$ of 506 ppm as polluting matter was used, and as a seed sludge, returned sludge in an activated sludge process unit for treatment of domestic wastewater was added in an amount of 1500 ppm. After an acclimation period of 15 days, the treating effects and the rate of production of excess sludge based on the BOD$_5$ removed were measured.

Specifically, in substantially the same manner as in Example 7, the chemical plant waste was adjusted to a pH of 7.0-7.5, and during the testing, the amount of the influence wastewater was adjusted so that in all of these test units, the BOD$_5$ volume load was 1.0 kg-BOD$_5$/m$^3$/day. The flow rate of air was 30 liters/min., and the temperature was 20° C.

In the present test, the thicknesses of the aeration tanks in the testing units were increased somewhat because the thicknesses of the supporting media were changed. Since the surface area of the supporting media was decreased, the surface area load of the filling material was set at 100 g-BOD$_5$/m$^2$/day in the fourth tank while it was 50 g-BOD$_5$/m$^2$/day in Example 7. The load was therefore somewhat excessive since the standard surface area load in the present method is 75 g-BOD$_5$/m$^2$/day.

The rate of production of excess sludge based on the removed BOD$_5$ was measured in the same manner as in Example 7. Specifically, the sludge in each of the sedimentation tanks was eliminated to empty the tanks. Then, for 10 days, the units were all operated under the same operating conditions, and the excess sludge was collected at the sedimentation tanks. It was then withdrawn, and the amount of dry sludge was measured in a conventional method. From the amount of BOD$_5$ removed by the testing units over the period of 10 days, the rate of production of excess sludge based on the BOD$_5$ removed was calculated.

The treating effects and the rates of production of excess sludge based on the BOD$_5$ removed due to differences in the thickness of the supporting media are shown in Tables 18 and 19.

Table 18

Comparison of Treating Effects due to Differences in the Thickness of the Supporting Media

| Testing Device No. | Thickness of Supporting Media | Treated Water | | | |
|---|---|---|---|---|---|
| | | $BOD_5$ | Percent Removal | $COD_{Mn}$ | Percent Removal |
| | (mm) | (ppm) | (%) | (ppm) | (%) |
| 1 | 10 | 26 | 96.6 | 71 | 86.0 |
| 2 | 15 | 12 | 98.5 | 40 | 92.1 |
| 3 | 20 | 9 | 98.8 | 32 | 93.6 |
| 4 | 30 | 8 | 98.9 | 28 | 94.4 |

Table 19

Comparison of Rates of Production of Excess Sludge by Differences in Thickness of Supporting Media

| Testing Unit No. | Thickness of Supporting Media | Rate (%) Production of Excess Sludge Based on $BOD_5$ Removed |
|---|---|---|
| 1 | 10 | 6.9 |
| 2 | 15 | 3.0 |
| 3 | 20 | 2.55 |
| 4 | 30 | 2.1 |

The tests shown in Tables 18 and 19 above were performed at the same time and at the same room temperature. It may be concluded that $BOD_5$ in the chemical plant waste treated in this example is relatively easy to remove, but $COD_{Mn}$ in it is difficult to remove.

For comparison, the same chemical plant waste was treated by a 10-liter test unit for the conventional activated sludge process. It was difficult however to reduce $COD_{Mn}$ to below 80 ppm under a volume load of 1.0 kg-$BOD_{5/m^3}$/day.

The results given in Tables 18 and 19 show that the adjustment of the thickness of the supporting media to at least 15 mm is advantageous in increasing the treating efficiency and reducing the rate of production of excess sludge.

Subsequent to the above biochemical treatment, the treated water was further treated with granular activated carbon.

EXAMPLE 9

In order to confirm the effects of the method of this invention in an enlarged unit domestic wastewater (the supernatant liquid after passing through a sedimentation tank) was treated by using a pilot test unit having the specifications shown in Table 20.

Table 20

Specifications of the Pilot Test Unit

| Item | Specification |
|---|---|
| Number of Aeration Tanks | 4 |
| Total Available Volume of the Four Tanks | 0.754 m³ |
| Number of Supporting Media | 24 |
| Total Surface Area of 24 Supporting Media Mats | 12 m² |
| Material of Supporting Media | Polyvinylidene chloride non-woven mats (1700 denier fibers; bulk density 0.05 g/cm³) |
| Thickness of Supporting Media | 20 mm |
| Space between Supporting Media | 30 mm |

The analytical values of the wastewater used in this example are shown in Table 21 below.

Table 21

Analysis of Domestic Wastewater

| Item | Analytical Value |
|---|---|
| pH | 5.8 |
| $BOD_5$ (ppm) | 198 |
| $COD_{Mn}$ (ppm) | 63 |

As a seed sludge, 1500 ppm of returned sludge in a unit for the activated sludge process of domestic wastes was added, and after an acclimation period of 15 days, the treating effects and the rate of production of excess sludge based on the $BOD_5$ removed were measured. The results obtained are shown in Tables 22 and 23 below.

Table 22

Results of Treatment of Domestic Wastewater

| Item | Analytical Value | Percent Decrease (%) |
|---|---|---|
| pH | 7.4 | — |
| $BOD_5$ | 42 ppm | 97.8 |
| $COD_{Mn}$ | 42 ppm | 93.3 |

Table 23

Rate of Production of Excess Sludge Based on Removed $BOD_5$ and the Concentration of Sludge

| Item | Measured Value |
|---|---|
| Rate of Production of Excess Sludge Based on Removed $BOD_5$ | less than 2% |
| Concentration of Sludge | 9500 ppm |

The loading conditions in the example shown in Tables 22 and 23 were a $BOD_5$ volumetric loading of 1.4 kg-$BOD_5/m^3$/day and a surface area loading of 88 g-$BOD_5/m^2$/day. The temperature of the wastewater during the test was 15° to 18° C.

In the experiment using the pilot testing unit superior treating effects were obtained as shown in Table 22.

The rate of production of excess sludge was less than 2% which is a value extremely small for domestic wastewater.

While the invention has been described in detail and with reference to specific embodiments thereof, it will be apparent to one skilled in the art that various changes and modifications can be made therein without departing from the spirit and scope thereof.

What is claimed is:

1. A method for wastewater treatment which comprises disposing in an aeration tank at least two nonwoven fibrous mats, wherein the fibers are synthetic fibers having a thickness of about 50 to 4,000 denier, having a three dimensional network structure as supporting media having a bulk density of about 0.01 to about 0.40 g/cm³, wherein said supporting media have a thickness of about 15 to about 30 mm and wherein at least two said supporting media are disposed in parallel to each other at an interval of about 20 to about 100 mm in the aeration tank, causing microorganisms to be retained on the surfaces in the interstices of the nonwoven mat, and oxidatively decomposing organic polluting matter in the wastewater using the microorganisms in the presence of oxygen.

2. The method of claim 1, wherein the synthetic fibers are fibers of nylon, polyvinylidene chloride or a polyester.

3. The method of claim 1, wherein the synthetic fibers have a thickness of about 100 to about 2,000 denier.

4. The method of claim 3 wherein the synthetic fibers have a thickness of about 80 to 1800 denier.

5. The method of claim 1, wherein the supporting media have a bulk density of about 0.02 to about 0.2 g/cm$^3$.

6. The method of claim 1 wherein said interval is of about 25 to 70 mm.

7. The method of claim 6 wherein said interval is about 40 to 60 mm.

8. An aeration tank for wastewater treatment with microorganisms which include therein at least two nonwoven fibrous mats, wherein the fibers are synthetic fibers having a thickness of about 50 to 4,000 denier, having a three-dimensional structure as supporting media having a bulk density of about 0.01 to about 0.40 g/cm$^3$, wherein said supporting media have a thickness of about 15 to about 30 mm and wherein said at least two supporting media are disposed in parallel to each other at an interval of about 20 to about 100 mm in the aeration tank.

9. The aeration tank of claim 8 wherein the synthetic fibers have a thickness of about 100 to about 2,000 denier.

10. The aeration tank of claim 7 whrein the synthetic fibers have a thickness of about 80 to 1800 denier.

11. The aeration tank of claim 8 wherein the interval is about 25 to 70 mm.

12. The aeration tank of claim 11 wherein the interval is about 40 to 60 mm.

* * * * *